United States Patent
Dethloff et al.

[15] 3,641,316
[45] Feb. 8, 1972

[54] IDENTIFICATION SYSTEM

[72] Inventors: Jurgen Dethloff, Elbchaussee 239, Hamburg; Helmut Grottrup, Faustleste 5, Munich, both of Germany

[22] Filed: Aug. 17, 1970

[21] Appl. No.: 64,548

Related U.S. Application Data

[63] Continuation-in-part of Ser. No. 857,957, Sept. 15, 1969.

[30] Foreign Application Priority Data

Aug. 21, 1969 Austria .............................. A 8005/69
Oct. 7, 1969 Austria .............................. A 9413/69
June 30, 1969 Austria .............................. 6199/69

[52] U.S. Cl. ..................................... 235/61.7 B, 340/149 A
[51] Int. Cl. .......................................................... G06k 7/01
[58] Field of Search ............... 235/61.12, 61.7 B; 340/149 A; 179/2 DP, 2 CA, 2 C, 9 DB, 6.3 CC; 194/4; 283/7

[56] References Cited

UNITED STATES PATENTS

| | | | |
|---|---|---|---|
| 3,028,659 | 4/1962 | Chow et al. | 235/61.12 C UX |
| 3,115,581 | 12/1963 | Kilby | 235/61.12 C UX |
| 3,134,254 | 5/1964 | Richard | 235/61.12 C UX |
| 3,185,964 | 5/1965 | Margiloff | 235/61.12 C UX |
| 3,401,830 | 9/1968 | Mathews | 235/61.12 C UX |
| 3,555,201 | 1/1971 | Kuehnle | 179/90 BD |

*Primary Examiner*—Thomas A. Robinson
*Assistant Examiner*—William W. Cochran
*Attorney*—McGlew and Toren

[57] ABSTRACT

An identification system comprises a number of freely transportable identificands carrying data to be identified arranged at plural correlation positions, and an identifier cooperable with the identificands, when inserted into the identifier, to check the identity of a user of an identificand. A transmitter in the identifier transmits, to the identificand, a number of data, corresponding to the number of correlation positions of the identificand, in succession from the correlation positions. An interpretor is included in the identificand and has input and output terminals, and a selector device in the identificand supplies the transmitted data to the input terminals of the interpreter. A transmitter in the identificand is modulated from the output terminals of the interpreter and transmits the resultant modulated signals to the identifier for processing and evaluation. The identificands may be in the form of flat cards carrying one or more rotatable wheels having numbers around their periphery. The numbers are normally concealed, but the user may, when ready to use the identificand, set one or more wheels to the desired number. When the identificand is inserted into the identifier, the identifier rotates the wheel or wheels back to the zero position to provide a number of pulses corresponding to the preset number on the wheel or wheels. Each card contains integrated circuits providing safety against falsification, and the identifier has means to detect any tampering with the integrated circuits.

35 Claims, 16 Drawing Figures

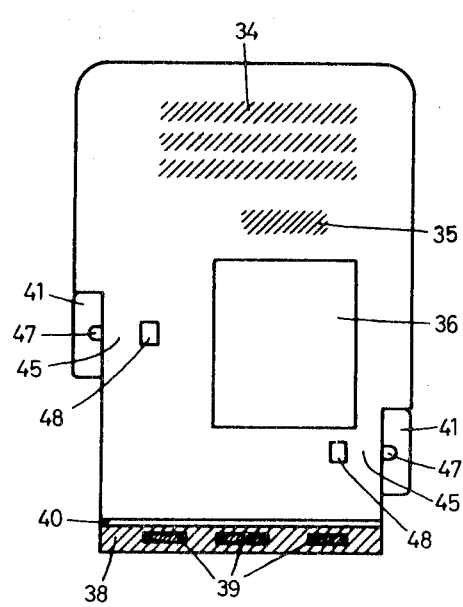
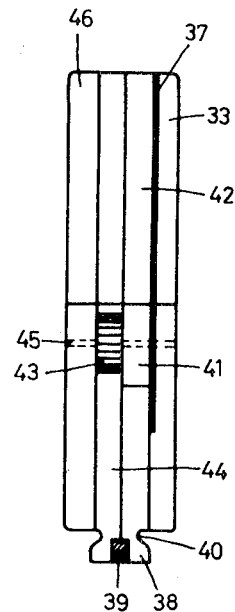
Fig.3　　　　Fig.4
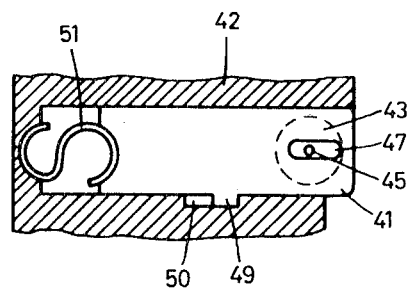
Fig.5

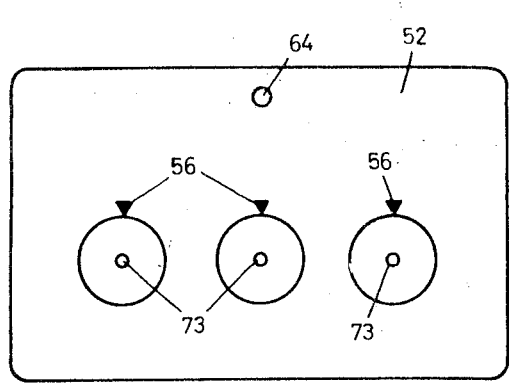
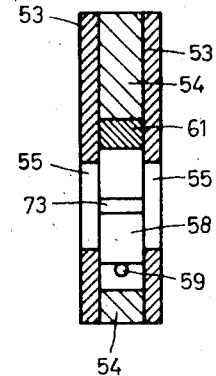
Fig.6     Fig.7
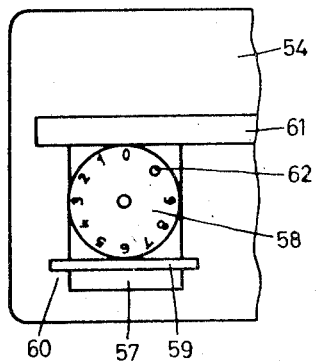
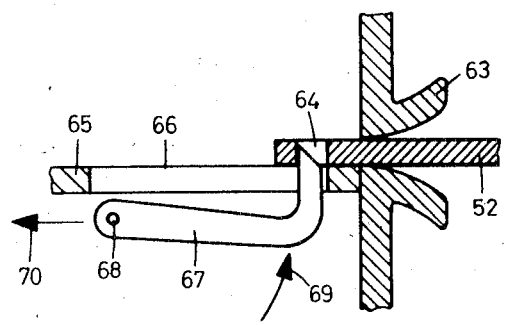
Fig.8     Fig.9
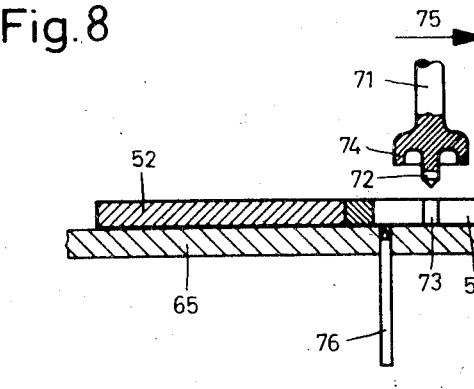
Fig.10

IDENTIFICATION SYSTEM

CROSS-REFERENCE TO RELATED APPLICATION

This application is a continuation-in-part of application Ser. No. 857,957, filed Sept. 15, 1969 for "Identification Switch."

BACKGROUND AND SUMMARY OF THE INVENTION

Copending application Ser. No. 857,957 is directed to an identification switch or system having the function of receiving certain offered information and correlating the same with a certain meaning. The arrangement thus consists, in principle, of two parts, the so-called "identificand," which carries the information, and the "identifier," which contains the evaluating circuit. The data of the various identificands are represented by the various linkages or interconnections of the respective correlator circuit contained in each identificand. The identifier includes a number of sending points and receiving points, between which the identificand establishes connections in accordance with its respective linkages or interconnections. The basic principle of the identifier is that the sending points act on the receiving points of the identifier with defined pulse currents through the linkages or interconnections contained in the identificand, thus storing the code of the identificand therein. The identificand and the identifier each have the same number, for example, 10, of spatially discrete receiving and sending points or positions.

With this arrangement, a parallel input of the interrogating pulses from the identifier, and a parallel output of the identification pulses from the identificand into the identifier is possible. However, the principle of correlation is not limited to the parallel operation or to the spatially discrete sending and receiving points or stations.

As a development of the invention covered by application Ser. No. 857,957, in the present invention, the data arriving from the identifier are supplied successively to the input terminals of the correlator or interpretor and, for this purpose, a suitable selector device is provided in the identificand. Furthermore, the identificand includes a transmitting arrangement whose modulation is determined by the output terminals of the correlator or interpretor, and by means of which the modulation, determined by the correlator or interpretor, is transmitted directly or indirectly to the identifier for processing.

For the distribution of the data, there may be provided, for example in the identifier, a clock providing pulses to successively mark the inputs of the correlator present in the respective identificand. A pulse group, containing a certain number of pulses, is correlated with each output terminal of the correlator or interpretor, so that the successively occurring pulse groups, at these output terminals, represent the code of the respective identificand. The pulse groups are derived by a pulse group generator, which is preset, according to the marked output of the correlator or interpretor, for the generation of the respective pulse group. The successively occurring pulse groups are stored in the identifier directly or coded, so that evaluation can be effected in the identifier.

For the sequential marking of the correlator pr interpretor input terminals, there may be provided, in the identificand, a counter which is advanced by the timing pulses of the identifier. The data sent from the identificand to the identifier can be stored in the latter in any suitable form. An advantageous arrangement comprises a matrix memory in which these data can be stored by lines or by columns, at the intersections of respective coordinates of the matrix grid. In this instance, of course, a preceding recoding is also possible, whereby the pulse groups are not stored directly.

In the arrangement shown in application Ser. No. 857,957, an additional integrated circuit is provided to secure against falsification. Since, for the serial evaluation of the present invention, integrated circuits in the identificand are expedient, it is advantageous to design the integrated circuit so that they can be used further for safety from falsification.

The transmission of pulses between the identifier and the identificand may be effected in many ways, as already described in application Ser. No. 857,957. Furthermore, the serial input and output of the present application is not limited to inductive transmission of the pulses. In the embodiments of the invention described hereinafter, there is explained, for the input of the pulses from the identifier into the identificand, transmission by means of modulated high frequency through an inductive coupling, while the output is effected directly through direct current pulses, again through an inductive coupling. Instead of this, a capacitive coupling may be used. Also, the modulated high frequency for the input into the identificand may be substituted by a direct pulse transmission process. Finally, the transmission may be effected optically, with a light source being provided in the identifier and a photocell in the identificand. In this case also, a receiving photocell, designed as a solar cell, could, simultaneously, furnish the current supply.

The current supply for the semiconductor circuit of the identificands may be derived from an external high-frequency source, in a manner already known. Alternatively, the current supply could be provided by a thermoelement heated by the identifier, or through a photosensitive solar cell. Finally, the current supply could be derived from the permanent data stroke received from the receiving coil or winding of the identificand, if the modulated interval is bridged by a small charging condenser.

The particular advantage of serial input and output is that only a small number of contact points or positions is needed. Another advantage is that the correlation field can be produced easily by a corresponding program control in the integrated circuit itself, and in such a manner that it differs from one identificand to another.

The present improvement over application Ser. No. 857,957 is not limited to the embodiments shown and described. In fact, combinations between the serial solution and the parallel solution are possible, for example, with serial input and parallel output or with parallel input and serial output, as well as arrangements for the input and output that are partly in parallel and partly in series.

The identificands and identifiers of application Ser. No. 857,957 comprise three novel technical features, namely, the correlation logic, the circuit for safety falsification, and the marking number in the identificands. Correlator circuits are known per se. Safety from falsification is attained in that there is provided, in the identificands, a component whose presence can be ascertained clearly by the identifier. This component is a specific integrated circuit, for the imitation of which very extensive manufacturing systems are necessary, so that falsification becomes unprofitable. Since the marking number is lodged in the identificand, rather than in the identifier as in known systems, spying out of the marking number is rendered impossible.

In application Ser. No. 857,957, the identificands are designed as small, key-type slides in which the above named three features are incorporated. In their mechanical construction, the identifiers correspond to this form of identificands. The carrying into effect of the principles mentioned above, however, is not limited to these forms of identificands or identifiers, but can be performed with numerous other forms. Thus, for example, identificands in the form of a pin of square cross section, or in the form which comes very close to the widely used "credit cards" and, at the same time, to arrange the identifiers for checking and for data transfer from these identificands. Accordingly, a further improvement over the disclosure of application Ser. No. 857,957 relates to a new identificand essentially in the form of a "credit card."

In accordance with this feature of the present invention, the identificand, which contains visually and machine-readable data serving for the identification of the identificand and for safety from falsification, is designed in card form. Additionally, there are provided devices for the selective setting of a two-digit or multidigit marking number, and means for covering the marking number in the inoperative state. Finally, the covering means are so designed that they are manually operable for clearing the view of the marking number, and can thereafter positively return to the inoperative position.

For the setting of the marking number, there may serve setting wheels whose digits are visible in a window in the identification card, and which window is covered, in the inoperative position, by the covering means. The covering of the marking number may be effected with correspondingly arranged slides, whose number corresponds to the number of digits of the marking number, and which are arranged at one of the two longer sides of the identification card for displacement crosswise or transversely of the longer sides. In the operative state, they cover up the windows and can be displaced manually for the setting of the marking number in such a way that the numbers or symbols to be set become visible in the window and that, after such setting, they return to the starting position under spring bias.

For the purpose of accommodating the setting wheels and the slides in a practical manner, it is expedient to construct the identification card in multiple layers. Further features thereof will become evident from the claims and the following description.

This card-type identificand obviously has many advantages. It is, however, further desirable to make the identificand card thinner and still more cardlike, and possibly to provide the authorized user with a second change of operation if the first setting of the marking number was faulty.

Consequently, another improvement over the disclosure of application Ser. No. 857,957 is a differently designed identificand card with visually and machine-readable marking numbers, for the handling of an identificand, in accordance with the disclosure of application Ser. No. 857,957, and with visually and machine readable data which serve for the identification of the identificand and possibly further for safety from falsification.

In accordance with this feature of the invention, for the setting of a two-digit or multidigit marking number, two or more number wheels are rotatably arranged between cover sheets of the identificand card for rotation about an axis perpendicular to the cover sheets. The cover sheets have opposed coaxial circular openings, whose diameter is smaller than the diameter of the number wheels. Finally, the number wheels are so displaced, in the inoperative state, relative to the openings by suitable means, that their numbers are not visible.

It is expedient if the number wheels are mounted in rectangular cutouts of the layer present between the two cover sheets, in such a way that, in the inoperative state, they are biased by a spring against a brake bearing and rest against the sidewalls of the cutouts.

An object of the invention is to provide an improved and simplified identification system.

Another object of the invention is to provide such a system including a number of identificands and identifier cooperable therewith, and in which a code in an identificand is transmitted successively to the identifier.

A further object of the invention is to provide the identificands in the form of cards resembling credit cards.

For an understanding of the principles of the invention, reference is made to the following description of typical embodiments thereof as illustrated in the accompanying drawings.

BRIEF DESCRIPTION OF THE DRAWINGS

In the drawings:

FIG. 3 is a top plan view of an identificand card in accordance with the invention;

FIG. 4 is a side elevation view of the card;

FIG. 5 is a view of the covering slide with the cover sheet removed;

FIG. 6 is a top plan view of another form of card form identificand;

FIG. 7 is a transverse sectional view of the card shown in FIG. 6;

FIG. 8 is a somewhat enlarged partial plan view illustrating the setting wheel; and FIGS. 9 and 10 are sectional views of the card insertion device of the identifier.

DESCRIPTION OF THE PREFERRED EMBODIMENTS

Figure 1:
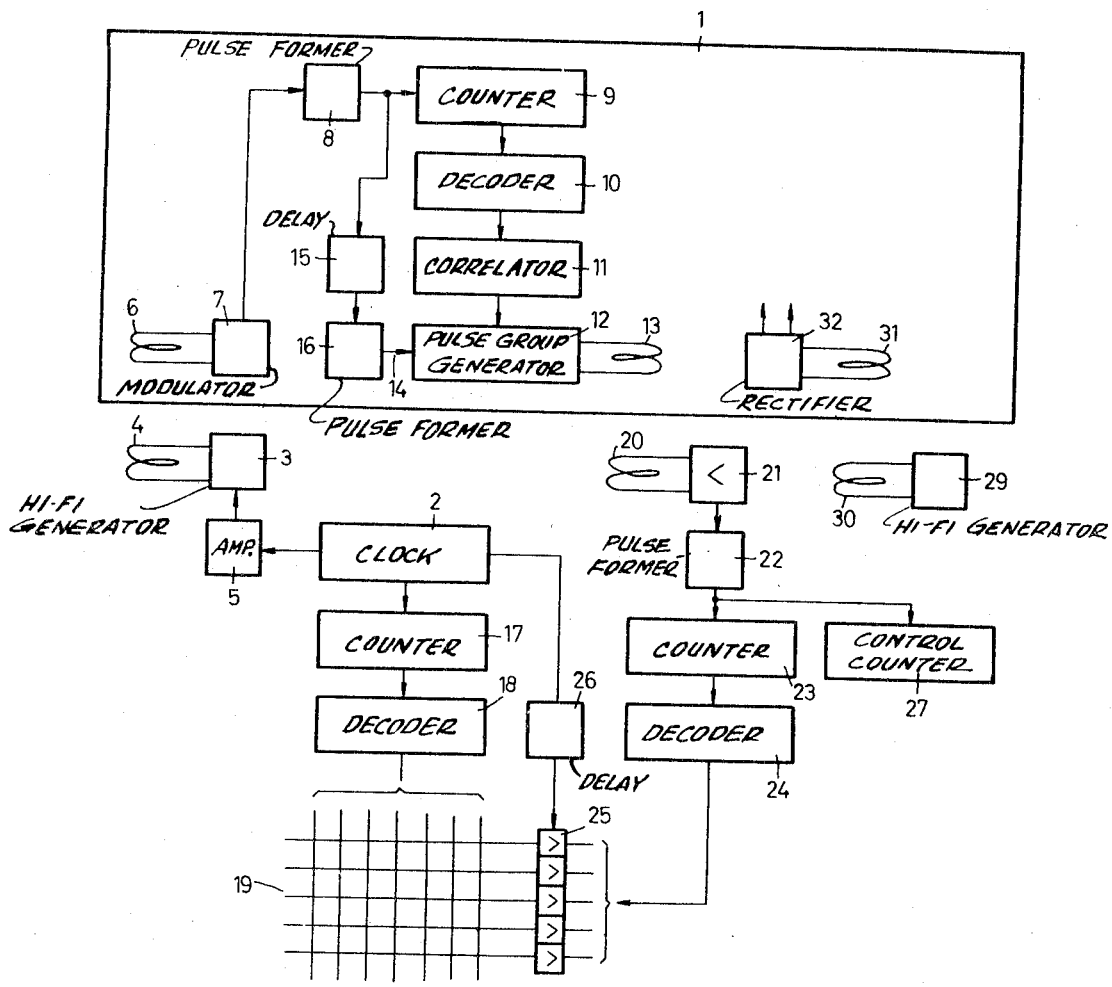
FIG. 1 is a block diagram of one embodiment of the invention for serial operations.

In FIG. 1, the rectangle 1 encloses the circuitry contained in the indetificand, and the rest of the circuitry is contained in the identifier. The central control equipment, which is set in operation responsive to the introduction of the identificand into the identifier, by means which have not been shown, is the clock 2 in the identifier and which emits ten pulses at relatively low frequency. After the introduction of the identificand into the identifier, there is started, also at the same time, high frequency generator 3 which initially furnishes an unmodulated signal to transmitter or sending coil 4. The pulses emitted by clock 2 modulate generator 3 through modulation amplifier 5, so that the high-frequency oscillation emitted by generator 3 is periodically set to zero. The resulting output voltage of sending or transmitting coil 4 is shown in FIG. 2a.

Figure 2:
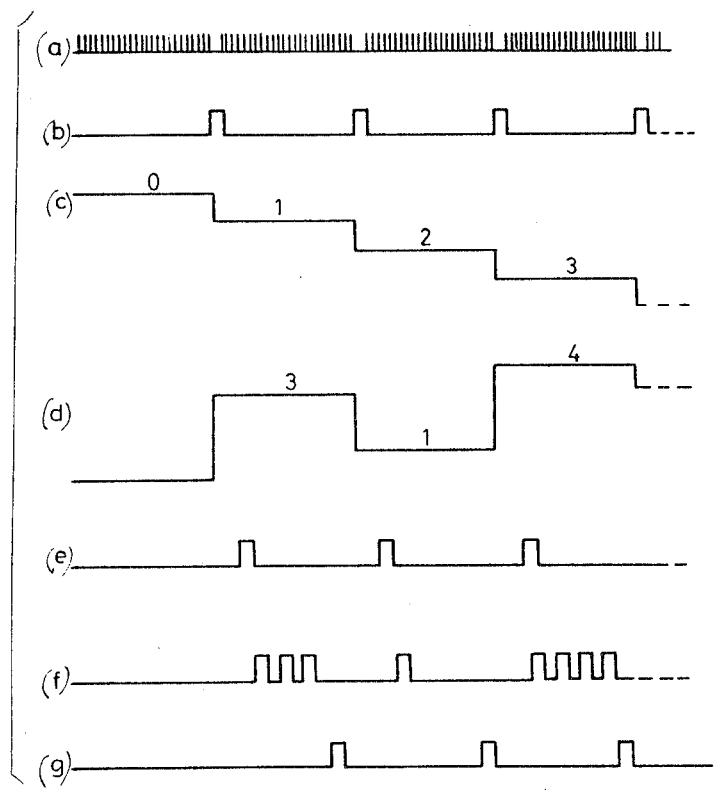
FIGS. 2a through 2g are pulse diagrams related to FIG. 1.

Adjacent sending coil 4, there is the receiving coil 6 of the identificand, and which receives the high-frequency energy depicted in FIG. 2a and supplies it to a modulator 7. The demodulation product is supplied to pulse-former stage 8, which directly charges a counter 9 with pulses. These pulses correspond to those shown in FIG. 2b. In inoperative position, counter 9 is in the zero position, and is brought, by the pulses shown in FIG. 2b, into the positions 1, 2, etc., up to the position 9.

The output lines of counter 9 normally are connected to a decoder 10 which, for example, for a decade type of counter 9, has 10 inputs from 0 to 9. The correlation or interpreting field 11, following decoder 9, has 10 inputs 0 to 9, and 10 outputs 0 to 9, each input being connected with one output. The connections between the inputs and outputs of correlator or interpretor 11 differ from one identificand to the next in accordance with the correlation logic, and represent the information stored in the respective identificands.

The 10 output lines of correlation or interpreting field 11 are connected with a pulse group generator 12, and effect a presetting of generator 12. Generator 12 emits, at its output, namely at the transmitting or sending coil 3, groups of pulses which, depending on the presetting, may contain one, two, three, etc., up to 10 pulses, when pulse generator 12 is activated with a pulse on input line 14. Such circuit arrangements are known.

Activation of pulse generator 12 by input line 14 is effected by the same pulse which drives counter 9, through a delay member 15 and an additional pulse former 16. The sequence of the process can be seen clearly from FIG. 2d, on the assumption of a given correlation. The output pulses of pulse former 8, as shown in FIG. 2b, drive counter 9 through the stages 0, 1, 2 etc., as shown in FIG. 2c. The corresponding inputs of correlation or interpreting field 11 are activated through decoder 10. Let it now be assumed that correlation field 11 is so connected that input 1 is connected with output 3, input 2 with output 1 and input 3 with output 4. There then results, for the presetting of pulse group generator 12, the diagram shown in FIG. 2d.

The delayed pulses shown in FIG. 2e, arriving on input line 14 of generator 12, actuate generator 12 each time, and causes to emit a pulse group, as is illustrated in FIG. 2f. Thus, the first pulse group comprises three pulses, the second pulse group comprises one pulse and the third pulse group comprises four pulses. The pulse group generator 12 is caused to emit as many pulse groups as the number of pulses supplied by clock 2, these groups having different numbers of pulses.

In the identifier, clock 2 further drives the counter 17 having the decoder 18 connected thereto. Decoder 18 prepares the columns of matrix 19, in sequence, for storage of information. The matrix memory 19 need not necessarily be a core memory. Similarly designed semiconductor configurations, for example, can be actuated in the same manner. The pulse groups emitted by sending coil 13 of the identificand are supplied, by receiving coil 20 of the identifier, to amplifier 21 and thence to a pulse former 22.

Pulse former 22 drives a counter 23 having a decoder 24 connected thereto. The outputs of decoder 24 prepare the line amplifiers 25 of matrix 19. At a suitable selection of decoder 24, therefore, only one line amplifier 25 is prepared. Alternatively, groups of line amplifiers 25 corresponding to a code can be prepared by other forms of decoder 24, or by omission of decoder 24 and direct connection of counter 23.

Through delay circuit 26, clock 2 supplies the pulses illustrated in FIG. 2g, and which therefore always occur after completion of the pulse groups of pulse group generator 18, that is, after setting of counter 23. These pulses cause the prepared line amplifiers 25 emit a recording pulse, which effects input into storage at the points of intersections of the respective line or lines with the column or columns of matrix 19, as prepared by decoder 18. In this way, the entire information of the identificand gradually is transmitted into matrix 19 and is there available for evaluation.

In the same manner as described in application Ser. No. 857,957, in the present arrangement a control counter 17 is connected to the output of pulse former 22. While, after termination of a pulse group, counter 23 is set to zero by means which have not been shown in FIG. 1, control counter 27 counts all pulses emitted by the identificand, and whose sum must be constant regardless of the information stored in the identificand, thus carrying out a control of the entire operation. Further control arrangements, as mentioned in application Ser. No. 857,957, may also be used in the present arrangement.

The current supply of the identificand is effected from high-frequency generator 29 of the identifier, which transmits its energy, through sending coil 30, to receiving coil 31 of the identificand. The received energy is rectified by rectifier 32 and is available at the output terminals thereof for the integrated circuit. Since storing elements are provided in the identificand, it is necessary to bring about a defined initial position, in particular of counter 9. This is carried out in a known manner, by means which have not been shown, by pickup of the current supply.

FIGS. 3 and 4 illustrate the new card-type identificand in top plan and side elevation view, with FIG. 5 showing the covering slide with the cover sheet removed. FIG. 4 is greatly enlarged in width or thickness to illustrate the details. In reality, the total thickness of the identificand card is about 1 mm. In the following, the identificand card is referred to as an ICARD.

FIG. 3 provides a view of front cover sheet 33 of the ICARD. This cover sheet is provided, in the usual manner, with visually readable information 34, for example the ICARD holder's signature 35 and his photograph 36, by insertion of a photographed foil or by direct photographic application on the back. This information layer 37 is also indicated in FIG. 4. To this extent, the ICARD corresponds to the normal construction of an automatically readable identification, for example a credit card. In contrast to other systems, however, the actual information to be ascertained is lodged in the foot 38 of the ICARD. Foot 38 therefore, as indicated by hatching in FIGS. 3 and 4, contains those electronic components 39 which are necessary for the realization of the correlation logic and which ensure safety from falsification in the form of a specific integrated circuit. The relatively large available area of foot 38 permits the accommodation of capacitive or inductive receivers for the energy supply and data transmission, as described in application Ser. No. 857,957.

Foot 38 is clearly set off from the main body of the ICARD by a notch 40, on both sides, and this notch fulfills several functions. After introduction of the ICARD into the identifier, two knives of the identifier descend, from opposite sides, into notches 40, and fix the entire ICARD in the correct position so that the scanning of the information from the electric components 39 can be effected reliably.

Moreover, by an AC voltage applied to these knives, there is a check as to whether conducting connections pass through between notches 40 from foot 38. Thereby, it is ascertained that the electronic components 39 are not just simulated outside the ICARD by constructions from discrete components and connected by conducting connections to corresponding receivers in foot 38.

As best seen in FIG. 3, the ICARD is notched at different distances from foot 38 at both edges. These notches are partly filled out by movable slides 41, which are guided in recess of the front inner sheet 42. Behind each slide 41, in a corresponding recess of the rear inner sheet 44, there is a setting wheel 43 which rotates about a pivot 45. By friction between slide 41 and rear cover sheet 46, setting wheels 43 are so braked that they do not become displaced inadvertently. Setting wheels 43 have a pheripheral serration and a zero abutment.

Each slide 41 has a slot 47, which is partly visible in FIG. 3. The function of slot 47, in the first place, is to prevent pivot 45 blocking movement of slide 41 in the longitudinal direction. Furthermore, slot 41 is continued far enough so that, when slide 41 is pressed in, it comes under the window 48 of front cover sheet 33. Front cover sheet 33 is opaque, at least in the vicinity of window 48 and above setting wheel 43. Window 48 is transparent. When slide 41 is displaced by hand in the longitudinal direction, so that it projects deeper into the ICARD, the view is cleared through the window 48 and the slot 47, now lying under this window, to a point on the circumference of the setting wheel, where a number or symbol which is present there can be read.

FIG. 5 illustrates one of the two slides 41 as it would appear if front cover sheet 33 were removed. Slide 41 is guided in a corresponding recess of front inner sheet 42, which, for greater clarity, has been hatched. Nose 49 of slide 41 engages in a recess 50 of front inner sheet 42 and limits the stroke of the slide 41 in both directions. Front inner sheet 42 and slide 41 are so designed that, between them, a flat S-shaped spring 51 can be inserted, and this holds slide 41 in the inoperative position shown in FIG. 5. Shaft 45 of the setting wheel 43, which latter has been shown in broken lines, does hinder movement of slide 41, as will be clear from the form of slot 47 as seen in its entirety in FIG. 5. With slide 41 pressed in, the left end of slot 47 reaches the ledge of setting wheel 43, and thereby clears the view of one of the symbols at the edge of setting wheel 43.

Since, at the same time the finger with which slide 41 is pressed inwardly comes in contact with the serrated or toothed circumference of setting wheel 43, the latter can be set to the desired symbol. After such setting, the finger is removed and thereby at the same time slide 41 is released. The slide 41 returns to its inoperative position, so that the set symbol is covered up by slide 41 and is no longer observable.

The effect of this is that it is made certain that spying in the use of the ICARD is impossible in the identifier. The authorized subscriber sets the marking number on the way to the identifier, that is, at a time when spying is ruled out due to the variability of the location. In the vicinity of the identifier itself, slides 41 cover up the set numbers.

The function of the setting wheel in the identifier will be referred to only briefly, as it has been described in detail in application Ser. No. 857,957. Upon introduction of the ICARD into the identifier, the setting wheel is mechanically set to zero. This zero position is defined by a nose of the setting wheel which fits positively against a corresponding abutment in the rear inner sheet of the ICARD. The path required for the zero setting of the setting wheel, or respectively the path of the ICARD still remaining after the zero setting upon introduction into the slot of the identifier, is measured at the identifier. This measurement defines the previously set marking number.

After extraction of the ICARD from the identifier, the setting wheels are all on zero, so that the preset marking number is rendered unrecognizable by a third party, such as a dishonest finder of a lost card. The described form of construction of the ICARD permits the setting of two-digit marking numbers. It can be readily seen that the number of digits can, if necessary, be increased by the introduction of additional slides and setting wheels.

FIGS. 6 through 10 show another embodiment of a card type identificand in accordance with an improvement on the disclosure of application Ser. No. 857,957. FIG. 6 is a plan view of the basic card 52 which, as can be seen from FIG. 7, is composed of three layers, including two outer cover sheets 53 and an inner main sheet 54.

Cover sheets 53 have circular cutouts 55 which are opposite each other and coaxial with each other. One cover sheet 53 bears, at the edge of each circular cutout 55, a marking 56, in the form of an arrow. For the rest, cover sheets 53 present the usual components of an identification card, such as the photograph of the holder, his signature, and data about his person and address. Representation of this information has been omitted.

As best seen in FIG. 8, main sheet 54 has cutouts 57 of rectangular form, for example, in which setting wheels 58 are mounted. Only one such cutout, with a single setting wheel, is shown in FIG. 8. From FIG. 7, whose transverse dimensions are greatly enlarged for greater clarity, it will be noted that setting wheels 58 are larger than the circular cutouts 53. Thereby, in the first place, movement of setting wheels 58 in rectangular cutouts 57 is ensured without any possibility of the setting wheels falling out through the circular cutouts 55.

In the inoperative position, setting wheels 58 are pressed, by spring wires 59, against brake bearing 61. Spring wires 59 are mounted in two small bearing grooves 60 at the edges of rectangular cutouts 57 in main sheet 54. Brake bearing 61 may be designed as a soft rubber or soft plastic strip, which is secured also in main sheet 54. Alternatively, it may be a corrugated or knurled metal strip. To increase the friction between setting wheel 58 and brake bearing 61, setting wheel 58 also may be knurled on its periphery.

In the inoperative position, therefore, each setting wheel 58 is located concentrically behind its associated circular cutout 55. The numbers 0–9, visible in FIG. 8 and positioned at the edge of setting wheel 58, or corresponding other symbols or letters, are, in the inoperative position, completely covered by a cover sheet 53, so that the position of setting wheel 58 in the inoperative position cannot be recognized. A bore 62, adjacent the edge of setting wheel 58, is also covered.

To actuate the setting wheels, a setting wheel 58 to be set is gripped with the thumb and index finger through circular cutouts 55 and lifted off brake bearing 61 against the bias of spring wire 59. By virtue of this movement, the numbers at the edge of the setting wheel 58 emerge from under the edge of cover sheet 53 in the vicinity of marking 56 and become visible. By rotation of the setting wheel with the thumb and index finger, the setting wheel can now be brought to the desired setting. THat is, the desired number can be set adjacent marking 56. After release of the setting wheel 58, the latter is again pressed against brake bearing 61 by the bias of spring wire 59. Thus, at the same time, all previously visible numbers are covered up by the edge of the circular cutout 55 and thus are invisible. The same setting can be carried out with the other setting wheel 58.

The operation and basic construction of that part of the identifier which checks the set number is illustrated schematically in FIGS. 9 and 10. The identifier has an introduction slot 63 into which the identification card 52, with the "hold" bore 64, is inserted beforehand. Bore 64 is shown also in FIG. 6. THe identification card 52 moves on a table 65 which has a slot 66. A pawl 67, which is biased clockwise about its pivot 68 in the direction of arrow 69 by a spring which has not been shown, moves in slot 66. Upon introduction of an identification card 52 into slot 63, pawl 67 is, at first, pressed down until it can drop into "hold" bore 64. By pressure switches, which have not been shown, a mechanism is now actuated and moves pawl 67, and thus identification card 52, along slot 66 in the direction of arrow 70, whereby the identification card is pulled all the way into the identifier.

The respective end position is shown in FIG. 10, in which the representation of the pawl and of the other movement mechanisms have been omitted. To simplify the illustration, the two cover sheets 53 of identification card 52 are shown in bolder black lines. In this in position, three drivers 71 descend onto the identification card 52, with the centering pins 72 engaging in the central bores 73 of setting wheels 58, these bores being shown in FIGS. 6 and 7. With further lowering of driver 71, the rubber-lined driver setters 74, which are disposed concentrically around the respective centering pin 72, set down on setting wheels 58 and thereby connect drivers 71 with setting wheels 58.

Subsequently, by means which have not been illustrated, drivers 71 make a displacement movement in the direction of arrow 75. Thereby, and in a manner similar with setting of wheels 58 using the thumb and index finger, drivers 71 disengage setting wheels 58 from brake bearings 61 and, at the same time, bring the setting wheels 58 into a position eccentric to circular cutouts 55. In table 65, three feeler pins 76 are so arranged that, after the displacement of the setting wheels 58, they can drop into the eccentric position and, after suitable rotation of the setting wheels 58, into the bores 62, thereby arresting the setting wheels. Feeler pins 76 are unblocked only after complete introduction of the identification card 52 into the identifier, so that they press onto setting wheels 58 under spring bias.

Now drivers 71 are rotated in the same direction until rotation is interrupted by feeler pins 76 stopping setting wheels 58. The angle of rotation necessary for this depends on the previous manual setting of the respective setting wheels 58, and hence is a measure of the numbers or symbols appearing adjacent markings 56 after the manual setting. By suitable means which have not been shown, this angle of rotation is transformed into an electrical information, for example, by rotary switches on drivers 71. After completion of this operation, all setting wheels 58 are back in the zero position, which is defined by feeler pins 76, and the originally manually set numbers are ascertained electrically through drivers 71.

If the then following examination of the set marking number shows that the setting was correct, then the processes subsequent to the identification are initiated in the identifier and the appertaining devices, such as automatic vendors, etc. If the setting was wrong, the subscriber is given a second chance to repeat the setting. For this purpose, the identification card 52 is moved out, by means of pawl 67, through introduction slot 63, but partly remains in the identifier and is arrested therein by pawl 67. At the partially projected or extracted position of the identification card 52, the three setting wheels 58 are well accessible and the markings 68 can be seen clearly so that, although card 52 is retained in the identifier, a new setting can be made. After this new setting, the checking process is initiated once more by a releasing mechanism especially provided for this purpose, and proceeds as described above. If the rechecking process does not provide a satisfactory result either, an alarm is set off and possibly the identification card is locked inside the identifier.

While specific embodiments of the invention have been shown and described in detail to illustrate the application of the principles of the invention, it will be understood that the invention may be embodied otherwise without departing from such principles.

What is claimed is:

1. An identification system comprising, in combination, a number of freely transportable indentificands carrying data to be identified arranged at plural correlation positions; an identifier cooperable with said identificands to check the identity of a user thereof; a first transmitter in said identifier transmitting, to an identificand inserted into said identifier, a number of data, corresponding to the number of correlation positions of the inserted identificand, in sequence from successive correlation positions a respective interpreter in each identificand, having input and output terminals; a respective selector device in each identificand supplying the data, transmitted by said transmitter, to the input terminals of the associated interpreter; and a respective second transmitter in each identificand connected to the output terminals of the associated interpreter to have applied thereto modulations determined by said associated interpreter; each second transmitter transmitting the resultant modulated signals to said identifier for processing.

2. An identification system, as claimed in claim 1, including a receiver in said identifier; a clock in said identifier emitting periodic pulses when activated; the input terminals of the interpreter of an inserted identificand being marked successively in the rhythm of the clock pulses of the identifier; a respective pulse group generator in each identificand connected to the output terminals of the associated interpreter, and present in accordance with each marked output to emit a pulse number fixedly correlated with the respective output; said pulse group generator transmitting the thus successively occurring pulse groups to said identifier, in the rhythm of the clock pulses, for storing for evaluation.

3. An identification system, as claimed in claim 2, including a respective counter in each identificand; the counter of an inserted identifier being advanced by said clock pulses and successively marking the input terminals of the associated interpreter; the marked output terminals of the associated interpreter effecting presetting of the associated pulse group generator which, in turn, is switched on by said clock pulses.

4. An identification system, as claimed in claim 3, in which the pulses transmitted from said identifier, actuated said counter directly, and actuate the pulse group generator of an inserted identificand through a respective delay circuit.

5. An identification system, as claimed in claim 1, including a matrix memory in said identifier having two sets of intersecting coordinates defining a grid; one set of coordinates being marked successively in the rhythm of said clock pulses and the other set of coordinates being marked by the pulse groups emitted by the inserted identificand.

6. An identification system, as claimed in claim 5, including a second counter in said identifier counting the pulses transmitted by the inserted identificand; and a decoder connected to said second counter and to said matrix memory and marking said other set of coordinates thereof.

7. An identification system, as claimed in claim 1, and including a respective presettable pulse generator in each identificand connected to the associated interpreter and, in accordance with the marking of the output terminals of the associated interpreter, generating pulses of different lengths which are evaluated in said identifier.

8. An identification system, as claimed in claim 1, in which said first transmitter successively sends different frequencies to the inserted identificand; the input terminals of the respective interpreter of each identificand consisting of frequency-selective filters which filter out the frequencies successively arriving thereat through a common input line; said interpreter effecting a rearrangement of the frequency sequence.

9. An identification system, as claimed in claim 8, in which said first transmitter successively sends different frequency combinations to the inserted identificand.

10. An identification system, as claimed in claim 1, including respective integrated circuits in each identificand simultaneously serving for safety from falsification of the associated identificand.

11. An identification system, as claimed in claim 1, in which transmission of pulses between said identifier and the inserted identificand is effected inductively.

12. An identification system as claimed in claim 1, in which transmission of pulses between said identifier and the inserted identificand is effected capacitively.

13. An identification system, as claimed in claim 1, in which transmission of pulses between said identifier and the inserted identificand is effected optically.

14. An identification system, as claimed in claim 1, in which current is supplied to the inserted identificand by transmission from a high-frequency generator in said identifier to a receiver in the inserted identificand.

15. An identification system, as claimed in claim 1, in which current is supplied to the inserted identificand from a thermoelement.

16. An identification system, as claimed in claim 1, in which current is supplied to the inserted identificand from a solar cell.

17. An identification system, as claimed in claim 1, in which current is supplied to the inserted identificand by a high-frequency transmitter in said identifier and an associated charger condenser.

18. For use in an identification system, as claimed in claim 1, an identificand with a visual and machine readable marking number and in the form of a card carrying visually and machine readable data serving for the identification of the identificand and for safety from falsification; said identificand including devices operable to selectively set a multidigit marking number; means covering the marking number in the inoperative state of the identificand; said covering means being constructed and arranged for manual operation to expose the marking number for setting of said devices; and means positively returning said covering means to the inoperative position.

19. An identification system, as claimed in claim 18, in which said devices for selectively setting a multidigit marking number comprise setting wheels carrying numbers visible in a window in said identificand; said window being covered by said covering means in the inoperative state.

20. An identification system, as claimed in claim 19, in which said identificand card has two longer sides; at least one of said longer sides supporting a number of slides corresponding to the number of digits of said marking number, said slides being displaceable transversely of said longer sides and, in the inoperative state, covering associated windows; said slides being manually displaceable, for setting of the marking number, to a position in which the numbers to be set are visible in the associated windows.

21. An identification system, as claimed in claim 20, in which said identificand card is constructed in multiple layers; said setting wheels and said slides being positioned between layers of said identificand card.

22. An identification system, as claimed in claim 18, in which said identificand card has a narrow end; and correlation logic and means providing safety from falsification positioned in said narrow end.

23. An identification system, as claimed in claim 22, including energy supply means and the means for data transmission positioned in said narrow end.

24. An identification system, as claimed in claim 22, in which said narrow end has notches serving for correct fixation of said identificand card in said identifier.

25. An identification system as claimed in claim 1, including an identificand with visually and machine-readable marking numbers, designed in the form of a card and containing visually and machine-readable data serving to identify the identificand and for safety from falsification; said identificand card comprising cover sheets; at least two wheels rotatably positioned between said cover sheets for setting a multidigit marking number; said cover sheets having opposite coaxial circular openings whose diameter is smaller than the diameter of said wheels; and means biasing said wheels relative to said circular openings, in the inoperative state, so that the numbers on said wheels are not visible.

26. An identification system, as claimed in claim 25, in which said identificand includes an intermediate layer between said cover sheets and formed with rectangular cutouts; said wheels being mounted in said rectangular cutouts; and respective spring means seating against the side edges of said cutouts and biasing the associate wheels into engagement with the respective brake bearings.

27. An identification system, as claimed in claim 26, in which each brake bearing comprises soft rubber.

28. An identification system, as claimed in claim 26, in which each brake bearing comprises soft plastic.

29. An identification system, as claimed in claim 26, in which each brake bearing comprises a metal strip having transversely extending abutments therealong.

30. An identification system, as claimed in claim 29, in which said wheels have abutments extending transversely of their circular peripheries for engagement with said metal strips.

31. An identification system, as claimed in claim 25, in which said identificand card is formed with a holding aperture; and a pawl in said identifier engageable in said holding aperture after introduction of the identificand card into said identifier.

32. An identification system, as claimed in claim 26, in which said wheels have central bores; said identifier having centering pins engageable in said central bores; and driver setters associated with said centering pins and providing for movement of said wheels against the bias of said spring.

33. An identification system as claimed in claim 32, in which each wheel has an eccentric bore; and feeler pins in said identifier engageable in said eccentric bores following eccentric movement of said wheels, to arrest movement of said wheels.

34. An identification system as claimed in claim 33, in which said identifier comprises electric means operable to determine the angle of rotation of said wheels until rotation thereof is arrested by said feeler pins; said angle depending on the preceding manual setting of said wheels.

35. An identification system as claimed in claim 33, including means in said identifier operable, after determination of a faulty setting of said marking number, to provide for partial extraction of the identificand card limited by said pawl which prevents complete extraction; and checking means in said identifier operable to trigger an alarm after a faulty marking number has ascertained twice.

* * * * *